United States Patent
Bennett et al.

(10) Patent No.: US 7,962,794 B2
(45) Date of Patent: *Jun. 14, 2011

(54) COMPUTER CHIP SET HAVING ON BOARD WIRELESS INTERFACES TO SUPPORT TEST OPERATIONS

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,047

(22) Filed: Aug. 16, 2010

(65) Prior Publication Data

US 2010/0306589 A1 Dec. 2, 2010

Related U.S. Application Data

(63) Continuation of application No. 12/369,939, filed on Feb. 12, 2009, now Pat. No. 7,779,301, which is a continuation of application No. 11/153,202, filed on Jun. 15, 2005, now Pat. No. 7,502,965.

(60) Provisional application No. 60/650,690, filed on Feb. 7, 2005.

(51) Int. Cl.
*G06F 11/00* (2006.01)
(52) U.S. Cl. .......... 714/30; 714/25; 714/724; 455/67.11
(58) Field of Classification Search .................. None
See application file for complete search history.

(56) References Cited

U.S. PATENT DOCUMENTS 7,181,663 B2 * 2/2007 Hildebrant .................. 714/726

* cited by examiner

*Primary Examiner* — Yolanda L Wilson
(74) *Attorney, Agent, or Firm* — Garlick Harrison & Markison; Holly L. Rudnick

(57) ABSTRACT

A method and apparatus are provided for an embedded wireless interface that is embedded in, for example, one of an input and output controller device for controlling input and output communications with off-board devices, within a memory controller device and a processor motherboard. The embedded wireless interface may be utilized as a wireless test access point to provide signal stimulations for test purposes or to monitor communications over a specified wired communication link.

18 Claims, 8 Drawing Sheets

COMPUTER CHIP SET HAVING ON BOARD WIRELESS INTERFACES TO SUPPORT TEST OPERATIONS

CROSS REFERENCE TO RELATED APPLICATIONS

The present U.S. patent application claims priority pursuant to 35 U.S.C. §120, as a continuation of and claims priority to U.S. patent application entitled, "Computer Chip Set Having On Board Wireless Interfaces to Support Test Operations," having a Ser. No. 12/369,939 and a filing date of Feb. 12, 2009, pending, which is hereby incorporated herein by reference in its entirety and made part of the present U.S. patent application for all purposes.

The Ser. No. 12/369,939 U.S. patent application claims priority pursuant to 35 U.S.C. §120, as a continuation of and claims priority to U.S. patent application entitled, "Computer Chip Set Having On Board Wireless Interfaces to Support Test Operations," having a Ser. No. 11/153,202 and a filing date of Jun. 15, 2005, now U.S. Pat. No. 7,502,965, issued Mar. 10, 2009, which is hereby incorporated herein by reference in its entirety and made part of the present U.S. patent application for all purposes.

The Ser. No. 11/153,202 U.S. patent application claims priority pursuant to 35 U.S.C. §119(e) to U.S. Provisional Patent Application entitled, "Computer Chip Set Having On Board Wireless Interfaces to Support Test Operations," having a Ser. No. 60/650,690 and a filing date of Feb. 7, 2005, which is hereby incorporated herein by reference in its entirety and made part of the present U.S. patent application for all purposes.

BACKGROUND

1. Technical Field

The present invention relates generally to computer system components, and more particularly, a system and method to wirelessly integrate computer system components, such as processors and chipsets, with both wireless and wired interconnects to support test operations.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Wired Local Area Networks (wired LANs), e.g., Ethernets, support communications between networked computers and other devices within a serviced area. These wired LANs often link serviced devices to Wide Area Networks and the Internet. Each of these networks is generally considered a "wired" network, even though some of these networks, e.g., the PSTN, may include some transmission paths that are serviced by wireless links.

Wireless networks have come into existence more recently. Examples include cellular telephone networks, wireless LANs (WLANs), and satellite communication networks. Common forms of WLANs, such as IEEE 802.11(a) networks, IEEE 802.11(b) networks, and IEEE 802.11(g) networks, are referred to jointly as "IEEE 802.11 networks." In a typical IEEE 802.11 network, a wired backbone couples to a plurality of wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support ad-hoc networking in which wireless terminals communicate directly to one another without the presence of an AP.

WLANs now also support voice communications via wireless voice terminals. In supporting the wireless voice terminals, the WLAN works in cooperation with a Private Branch Exchange (PBX) to interface the WLAN with the PSTN. A serviced call is routed between the PSTN and a serviced wireless voice terminal via the PBX and the WLAN. In addition to WLANs, personal area networks (PANs) are gaining in popularity. Initially conceived to reduce cabling between devices, PAN technologies, and more specifically, Bluetooth-based PANs or piconets, are adding yet another wireless layer to existing networks. For example, Bluetooth radios may be embedded in wireless headsets, printers, wireless keyboards, etc., to communicatively couple a peripheral device to a network component. For example, Bluetooth may be used to wirelessly couple a wireless headset to a handset that may be used in either a cellular network or merely in a PSTN based cordless phone.

Personal computers (PCs) and computer networks such as Local Area Networks (LANs) have become one of the most important devices for storing and sharing data in business. Thus, PCs and computer networks have become one of the most critical pieces of equipment in a business office. Computer networks typically have numerous personal computers and other data processing devices connected together for information exchange. At the heart of the computer network are one or more file servers. In most computer networks, file servers are more powerful versions of PCs which administer and store the documents generated by each of the personal computers in the system. In addition to managing the network, file servers also include the capability to monitor faults in themselves and the computer network. If a fault is detected, the file server provides a warning of the fault and, in certain instances, may also provide diagnostic operations, and may even implement corrective measures.

Servers are designed to provide client work stations with fast access to files and applications stored by the server. Accordingly, file servers embody a computer which responds to an operating system program (a popular operating system being, for example, WINDOWS®, or LINUX®) to not only orchestrate the files but also to maintain file security, file backup, or other file management features. Recently there has been a steady increase in the number of computer systems that are used in businesses, as well as the number of chipsets and peripherals associated with each computer system. The trend places one or more servers at each location of a business, rather than using a single mainframe computer at a centralized location. Typically, a company has an individual or department responsible for administering all of the file servers. In many instances, the administrator or administration department is headquartered at one site. Thus, each of the servers must be maintained and monitored remotely.

Monitoring may involve gathering and interpreting management, health and performance information about individual computer systems and file servers. Numerous monitoring systems are available to automatically alert designated persons when a computer system, file server or software application has failed. When such a failure occurs, the persons being notified may be in a remote location and may not be able to directly access the failed PC.

It is certainly beneficial to monitor certain server functions. Downtime caused by server failure may be the most costly expense incurred in running a distributed computer system. The causes of a server failure or "crash" are numerous. Any number of malfunctions or design flaws associated with the server hardware, server operating system or application programs running on a server may cause a server to crash. If a server crashes, then file access is often lost and business records are temporarily inaccessible until the cause of failure is fixed.

Typically, monitoring is achieved by interfacing via wired connects to monitoring hardware and sensors that gather management, health, and performance information on the computer system, with the operating system. To interface the monitoring hardware and sensors, users install and maintain complex drivers and programs to gather and interpret the management, health, and performance information. The burden of maintaining these drivers to support the monitoring hardware and sensors is often significant. In fact, this burden can be so great that users often choose not to install these management/monitoring functions in order to avoid this burden.

Companies often develop special proprietary hardware and drivers as part of management packages that gather and interpret management, health, and performance information from the monitoring hardware and sensors. This hardware requires ongoing support to ensure proper operation with new hardware platforms and operating systems. Additionally, "open source" operating systems, such as LINUX, require that the source code associated with drivers operating within the "open source" operating system be freely available and "open source" themselves. As companies have often spent significant resources developing the management hardware and software drivers to support the management hardware, the companies do not typically want to freely provide this proprietary source code.

One problem not adequately addressed in the prior art, however, is that gaining access to a particular communication path or circuit element may be technically challenging. For example, as integrated circuits and devices become increasingly more complex, input/output pins and ports become increasingly more in value. As such, a third party wanting access to a particular point may not be able to gain such access either in a technical sense, or in a political sense, in that the third party would have to convince the developer of the circuit to provide such access. Another problem not adequately addressed in the prior art relates to improving a number of communication paths in a very dense piece of silicon or semiconductor material used to create the integrated circuit. As such, routing signals from one end of an integrated circuit to another may become an expensive, or at least challenging, task. Finally, between two points on a motherboard or between two separate circuit boards, for example, a primary wired link may fail without providing any indication of the cause of the failure. Access to a failed device, however, is often necessary in today's world of companies providing assistance from a remote location. Thus, what is needed, is a system that creates the additional communication links and that provides access to a particular circuit element or device by test and/or monitoring equipment.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Preferred embodiments of the present invention are illustrated in the figures, like numerals being used to refer to like and corresponding parts of the various drawings. Certain terms are used throughout the description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical, mechanical, or optical connection. Thus, if a first device couples to a second device, that connection may be through a direct electrical, mechanical, or optical connection, or through an indirect electrical, mechanical, or optical connection via other devices and connections. The term "computer" is used in this specification broadly and includes a personal computer, workstation, file server, or other microprocessor-based device, which can be programmed by a user to perform one or more functions and/or operations.

Figure 1:
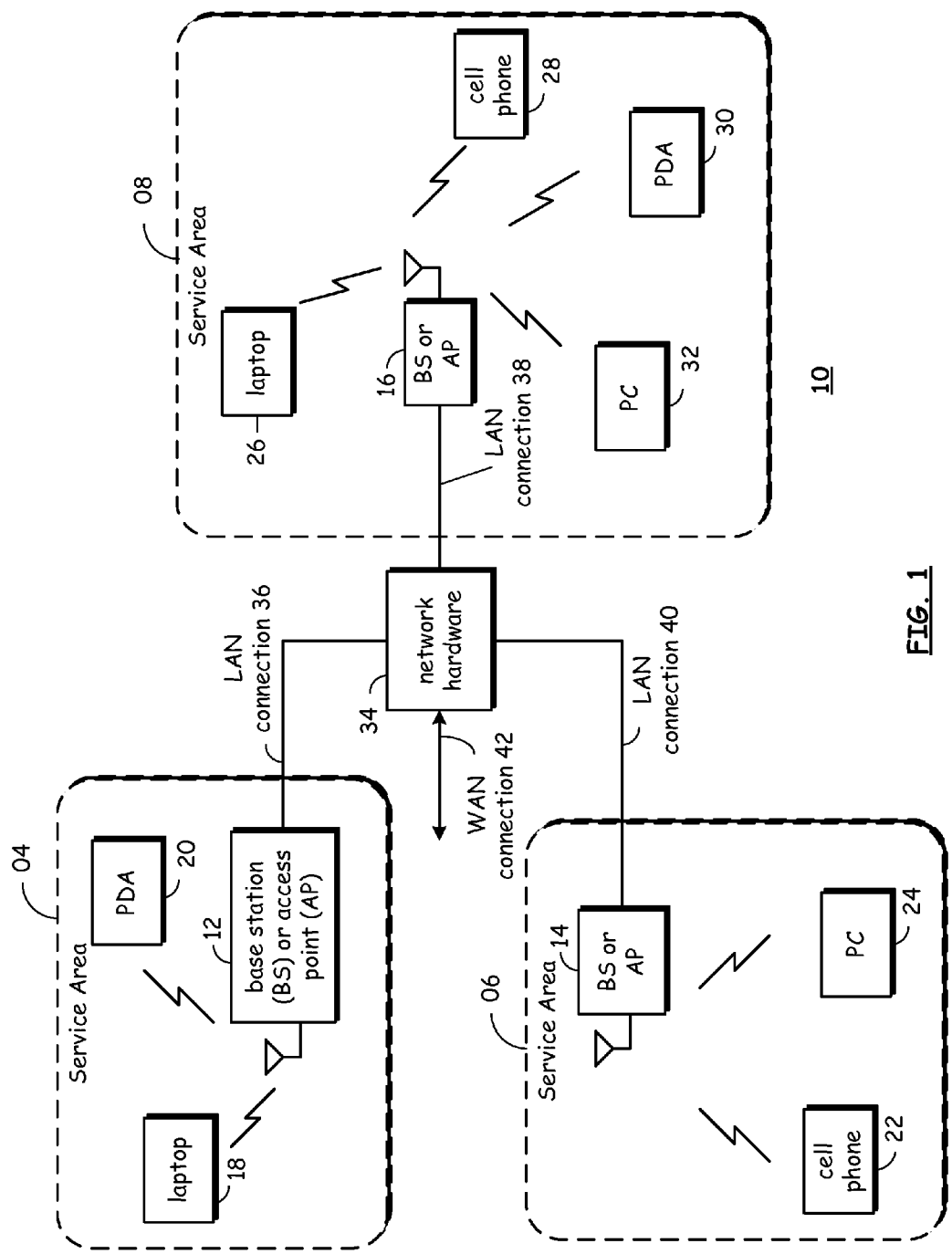
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-7.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10 to an external network element. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
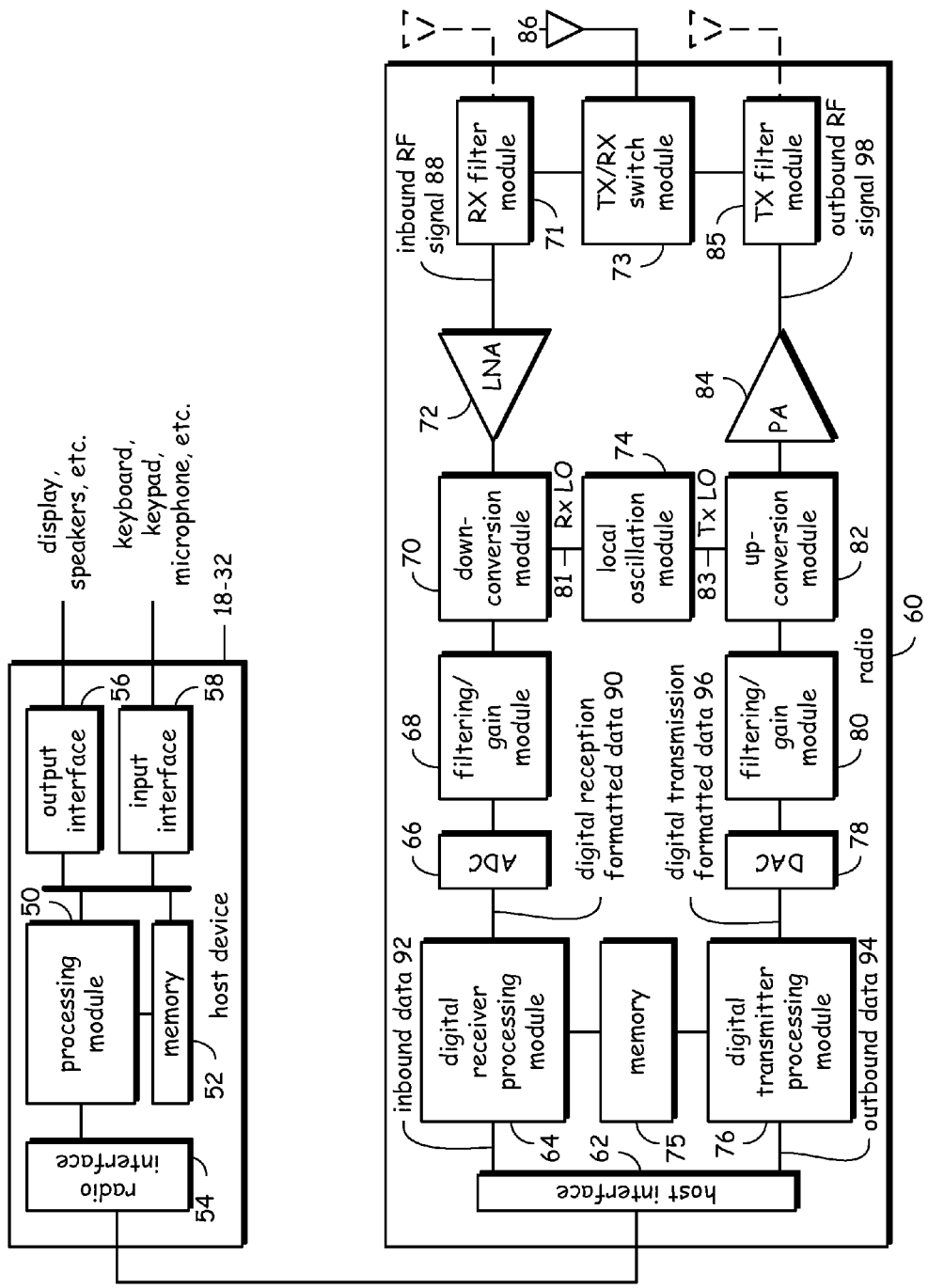
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device, such as a display, monitor, speakers, etc., such that the received data may be displayed. Radio interface 54 also provides data from processing module 50 to radio 60. Processing module 50 may receive the outbound data from an input device, such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an up-conversion module 82, a power amplifier (PA) 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from host wireless communication device 18-32 via host interface 62. Host interface 62 routes outbound data 94 to digital transmitter processing module 76, which processes outbound data 94 in accordance with a particular wireless communication standard (e.g., IEEE 802.11a, IEEE 802.11b, Bluetooth, etc.) to produce digital transmission formatted data 96. Digital transmission formatted data 96 will be a digital baseband signal or a digital low IF signal, where the low IF typically will be in the frequency range of 100 kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via TX/RX switch module 73, where RX filter module 71 bandpass filters inbound RF signal 88. The RX filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the host wireless communication device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of host device 18-32 and digital receiver processing module 64 and digital transmitter processing module 76 of radio 60 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current minor devices formed within the one or more integrated circuits.

The wireless communication device of FIG. 2 is one that may be implemented to include either a direct conversion from RF to baseband and baseband to RF or for a conversion by way of a low intermediate frequency. In either implementation, however, for up-conversion module 82 and down-conversion module 70, it is required to provide accurate frequency conversion. For down-conversion module 70 and up-conversion module 82 to accurately mix a signal, however, it is important that local oscillation module 74 provide an accurate local oscillation signal for mixing with the baseband or RF by up-conversion module 82 and down-conversion module 70, respectively.

Accordingly, local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
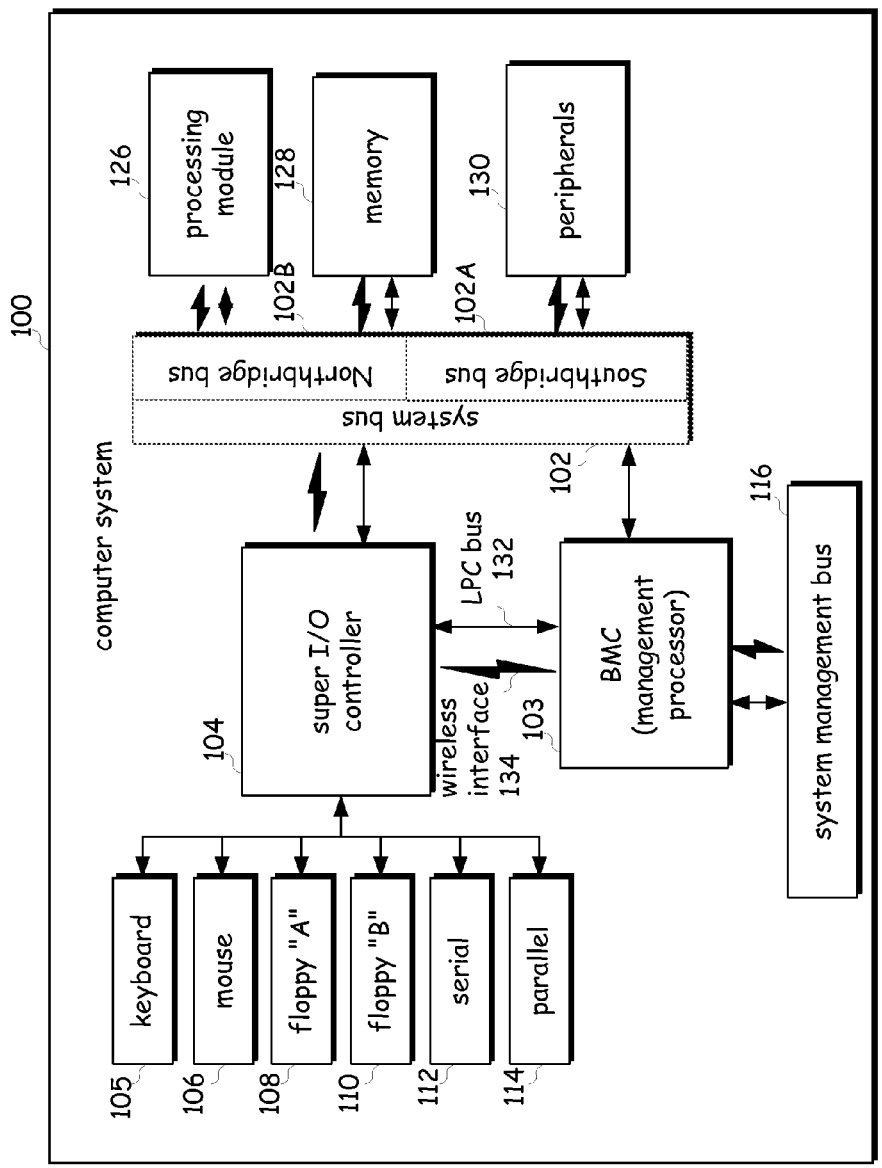
FIG. 3 is a functional block diagram that provides an architectural overview of a computer system according to one embodiment of the present invention.

FIG. 3 is a functional block diagram that provides an architectural overview of a computer system 100 according to one embodiment of the present invention. Computer system 100 may perform the role of either a file server or client workstation. Each of these components shown in FIG. 3 may be mounted on or operably coupled to a motherboard.

The present invention provides a system and method to integrate computer system components that substantially addresses the above-identified needs as well as other needs. More specifically, the present invention provides a system and method to wirelessly integrate computer system components. This involves embedding a wireless interface within a plurality of integrated circuits. These integrated circuits may be a processor or a chipset used to support a computer processor. Wirelessly coupling these integrated circuits may utilize a wireless communication pathway having a Bluetooth or 802.11 (radio transceiver) integrated onto a processor or chipset. This wireless communication pathway may be in parallel with a wired communication ordered to reduce the complexity of the supporting printed circuit boards. This could be taken to the point wherein individual chips making up a chipset or, on a larger scale, a computer system, are all wirelessly integrated such that the supporting circuit boards merely need to provide power to the individual integrated circuits.

One specific embodiment provides a computer system having a motherboard wherein a first wireless transceiver is integrated onto the processing integrated circuit that allows the processing integrated circuit to be wirelessly coupled to Northbridge, Southbridge, and other chipsets within the computer system that also have a wireless transceiver. This wireless coupling may serve as a parallel communication path to wired interconnects which may exist between these components.

In another embodiment, the wireless transceiver may be operably coupled or integrated to other integrated circuits, such as a multi-function integrated circuit like the super I/O chip within the computer system. In one embodiment, this allows a remote device to interface through a wireless connection integrated in the multi-function integrated circuit. In this manner, the remote device could conceivably emulate a device that typically couples to the serial port or other interfaces provided by the Super IO multi-function integrated circuit in order to troubleshoot operation of the computer system, secure operations in the computer system, troubleshoot or gather other data associated with the operation of the computer system, or to upgrade or update firmware within the computer system.

In yet another embodiment, wireless transceivers are located in the Southbridge, Northbridge and other chipsets. The Southbridge serves as an input/output device for the computer system. The Northbridge is one of two chips in the chipset on a PC motherboard that defines the capabilities of the motherboard. Typically, the Northbridge chipset controls the operation of the memory bus and graphics bus. The Southbridge chip normally controls the operation of the advanced technology attachment (ATA) interface, serial ATA interface, the redundant array of independent discs (RAID) controller, the peripheral component interconnect (PCI) bus, the universal serial bus (USB), IEEE 1394 firewall wire bus, the PS/2 interface for keyboard and mouse, the serial port, parallel port, floppy drive controller, and Ethernet interface. Additionally, some chipsets also contain audio and/or video CODEC or controllers. These wireless transceivers allow the Northbridge, Southbridge, and other like chipsets to operably couple and communicate with the processor.

Wireless transceivers may be used to interface with peripherals as well. For example, it may be possible to use a wireless interface to drive a monitor or other visual display. Similarly, this same wireless interface may be used to operably couple the computing system to peripherals such as a keyboard or mouse, a wireless headset that may include either an ear piece or microphone or both, or other like devices known to those skilled in the art.

Referring back to FIG. 3, the motherboard, also known as a mainboard or systemboard, is the central or primary circuit board (PCB) making up a computer system or other complex electronic system. A typical computer is built with the microprocessor, main memory, and other basic components on the motherboard. Other components of the computer, such as external storage, control circuits for video display and sound, and peripheral devices, are typically attached to the motherboard via connectors or cables of some sort.

In most computer systems, all of the basic circuitry and components required for a PC to function sit either directly on the motherboard or on an expansion card in a slot of the motherboard. The most important component on a motherboard is the chipsets. Chipset is a generic term for a group of electronic microprocessors and peripheral digital integrated circuitry (literally meaning set of chips). Originally, chipset referred to custom graphic chips where the graphics and sound functionality was included in separate coprocessors. A coprocessor is a computer processor used to supplement the functions of the primary processor (the CPU) that works in parallel with the main CPU. Today, different chipset technologies can have major impacts on a computer performance, especially on multiprocessor multiprocessing systems. Multiprocessing is traditionally known as the use of multiple concurrent processes in a system, as opposed to a single process at any one instant Like multitasking which allows multiple processes to share a single CPU, multiple CPUs may be used to execute multiple threads within a single process. Multiprocessing for general tasks is often fairly difficult to achieve due to various programs holding internal data.

Continuing to refer to FIG. 3, computer system 100 includes a system bus 102 that further includes two components or chipsets known as a Northbridge 102B and Southbridge 102A. Northbridge 102A is traditionally one of the two chipsets in the core logic chipset on a PC motherboard. Rarely, these two chips have been combined onto one die when design complexity and fabrication processes permitted. In general, however, core logic chipsets are divided into two main parts.

Northbridge 102B typically handles communications between the CPU, RAM, and Accelerated Graphics Port (AGP). Southbridge 102A is the other one of the two chips in the chipset on a PC motherboard that defines the capabilities of the motherboard. The Southbridge chip normally defines and controls the operation of all buses and devices that are not handled by the Northbridge chip. This almost always includes the Peripheral Component Interconnect (PCI) bus for attaching peripheral devices to a computer motherboard in a so-called local bus. These devices can take the form of: integrated circuits fitted on the motherboard itself (called planar devices in the PCI specification) or expansion cards that fit in sockets.

A computer PS/2 interface for keyboard, mouse, serial port, the parallel port, and the floppy drive controller all typically interface through the Southbridge. Some of these functions are often handled by a secondary I/O controller, and in that case the Southbridge provides an interface to this chip. On newer machines, Southbridge 102A will also generally include support for the parallel Advanced Technology Attachment (ATA) interface for connecting storage devices, such as hard disk drives and CD-ROM drives inside personal computers, Ethernet and Universal Serial Bus (USB). It is referred to in many ways, including abbreviations such as IDE, ATAPI, and UDMA. ATA standards only allow cable lengths in the range of 18 to 36 inches (450 to 900 mm), so the ATA interface is normally used as an internal computer storage interface. It is the most common and the least expensive interface for this application. The Universal Serial Bus (USB) provides a serial bus standard for connecting devices to a computer (usually a PC). A USB system has an asymmetric design, consisting of a single host and multiple devices connected in a tree-like fashion using special hub devices. Up to 127 devices may be connected to a single host, but the count must include the hub devices as well, so the total useful number of connected devices diminishes somewhat. There is no need for a terminator on any USB bus, as there is for SCSI and some others. A particular Southbridge will usually work with several different Northbridges, but these two chips must be designed to work together.

Returning to the discussion of FIG. 3, computer system 100 includes Baseboard Management Controller (BMC) 103 serving as the management processor; a super I/O controller 104, wherein super I/O controller 104 further contains keyboard interface 105, mouse interface 106, floppy "A" interface 108, floppy "B" interface 110, serial port interface 112 and parallel port interface 114; system bus 102; system management bus 116, wherein system management bus 116 may comprise low bandwidth bus and receives inputs from sensors, processing module 126; memory 128; and peripherals 130.

Processing module 126 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 128 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 126 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Various peripheral devices 130 may include for example, DVD-ROM drives, data drives using compression formats such as the ZIP format, and Personal Computer Memory Card International Association (PCMCIA) slots/drives. These peripheral devices may permit removable data storage media to be inserted in appropriate receptacles, where the data stored on the media may be read by circuitry. Various peripheral devices are available in the industry, including keyboards, monitors, mice, printer, and speakers, among others. In addition, as one skilled in the art will understand, various composite peripheral devices may connect, including devices that combine the features of conventional items, such as printers/scanners/fax machines, and the like.

FIG. 3 generally illustrates the architecture of computer system 100 that employs both wired and wireless interconnects, such as wired LPC bus 132 and wireless interface 134. As may be seen, many of the circuit blocks of FIG. 3 show a parallel communication link comprising at least one wired link and at least one wireless link similar to LPC bus 132 and wireless interface 134. One should realize that many different architectures and types of wired and wireless links are possible without departing from the spirit of the present invention. For example, some architectures divide system bus 102 into two busses, the Northbridge 102B and Southbridge 102A. Various system bus compliant devices may connect to system bus 102. Through system bus 102, the processing module 126 can communicate (either via wire or wireless pathways) with various system devices, including, but not limited to, the peripheral devices 130 connected to the system bus 102. In accordance with the protocol of system bus 102, such as the peripheral component interconnect (PCI) bus protocol, various devices may read data from and write data to memory 128.

File servers administer and store documents generated by individual client workstations (personal computers) linked to the file server. In addition to managing the network, file servers also include the ability to monitor faults within themselves and the computer network. Such monitoring includes management, health and performance information. If, for example, a fault is detected, the file server may provide a warning of the fault and, in certain instances, provide diagnostic operations and even implement corrective measures. These faults are often detected by on-board sensors such as, but not limited to, a fan tachometer, a temperature sensor, or an on-chip temperature sensor. These sensors and other like sensors provide their outputs through system management bus 116 operably coupled to BMC 103.

Previously, these sensors required special interconnects to couple with computer system 100. However, by wirelessly coupling these sensor outputs directly to BMC 103, the need to create and maintain specialized hardware interconnects is reduced or eliminated. Furthermore, a diagnostic device may wirelessly couple to computer system 100 to gather sensor outputs or interface via super IO controller 104.

The present invention integrates computer system components that substantially address the above-identified needs as well as other needs. More specifically, the present invention provides a system and method to wirelessly integrate computer system components. This involves embedding a wireless interface within a plurality of integrated circuits. These integrated circuits may be a processor or a chipset used to support a computer processor. Wirelessly coupling these integrated circuits may utilize a wireless communication pathway having a Bluetooth or 802.11 (radio transceiver) integrated onto a processor or chipset. This wireless communication pathway may be in parallel with a wired communication ordered to reduce the complexity of the supporting printed circuit boards. This could be taken to the point wherein individual chips making up a chipset, or on a larger scale a computer system, are all wirelessly integrated such that the supporting circuit boards merely need to provide power to the individual integrated circuits.

One specific embodiment provides a computer system having a motherboard wherein a first wireless transceiver is integrated onto the processing module 126 that allows the processing integrated circuit to be wirelessly coupled to Northbridge 102B, Southbridge 102A, and other chipsets within the computer system that also have a wireless transceiver. This wireless coupling may serve as a parallel communication path to wired interconnects which may exist between these components. In another embodiment, the wireless transceiver may be operably coupled or integrated to other integrated circuits, such as a multi-function integrated circuit like the super I/O chip within the computer system.

Figure 4:
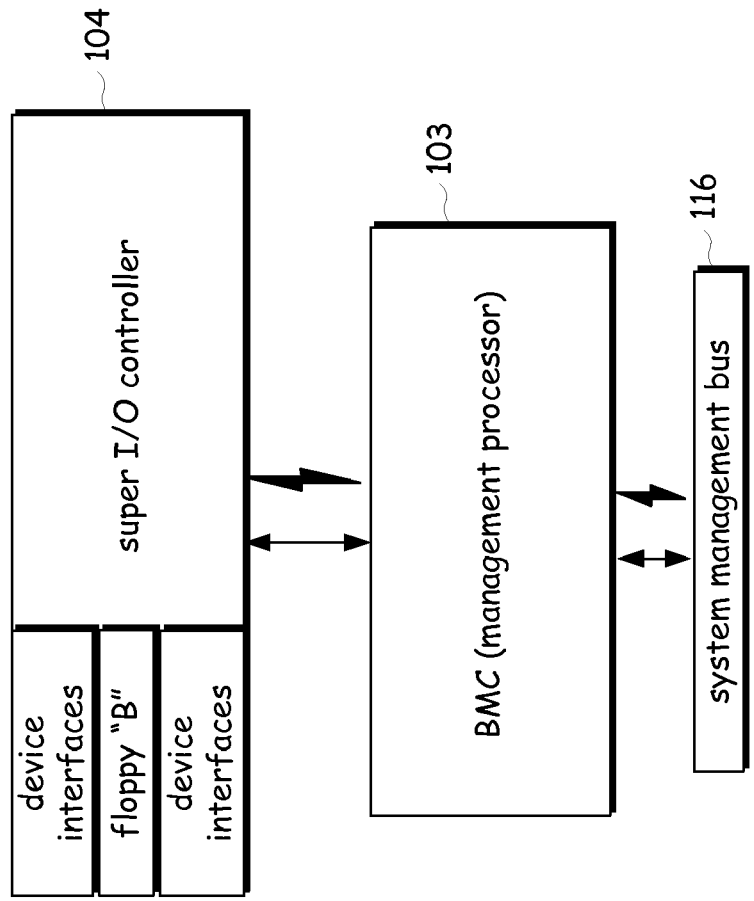
FIG. 4 depicts a BMC coupled to a super I/O controller using both wired and wireless interconnects.

FIG. 4 depicts BMC 103 coupled to the super I/O controller 104 using both wired and wireless interconnects. Information wirelessly written to the system management bus 116 of FIG. 3 may include, but should not be limited to, fan tachometer outputs, temperature sensor outputs, ECC memory errors, storage subsystem statistics, firmware revisions, unit ID LED (UID) information, as well as other like inputs known to those skilled in the art. This management, health, and performance data may be written in any format.

This allows access to sensor outputs without the need to install complex drivers or programs to interpret or format the raw information. Further, since the interface is inherent in the X86 architecture, there is minimal cost associated with activating this feature. Typically, the architecture of computer system 100 couples integrated circuits containing a floppy disk drive (FDD) controller, such as super I/O controller 104, to BMC 103.

In one embodiment, this allows a remote device to interface through a wireless connection integrated in the multi-function integrated circuit. In this manner, the remote device could conceivably emulate a device that typically couples to the serial port or other interfaces provided by the super I/O multi-function integrated circuit in order to troubleshoot operation of the computer system, secure operations in the computer system, troubleshoot or gather other data associated with the operation of the computer system, or to upgrade or update firmware within the computer system. In one embodiment, the circuit device containing the wireless interface further includes corresponding emulation logic to communicate with emulation logic in the remote I/O device.

In yet another embodiment, wireless transceivers forming a wireless interface are located in the Southbridge 102A, Northbridge 102B and other chipsets. The Southbridge 102A serves as an input/output device for the computer system. The Southbridge chip normally controls the operation of peripherals 130. These peripherals may include, but are not limited to, the advanced technology attachment (ATA) interface, serial ATA interface, the redundant array of independent discs (RAID) controller, the peripheral component interconnect (PCI) bus, the universal serial bus (USB), IEEE 1394 firewall wire bus, the PS/2 interface for keyboard and mouse, the serial port, parallel port, floppy drive controller, and Ethernet interface. Additionally, some chipsets also contain audio and/or video CODEC or controllers. These wireless transceivers allow the Northbridge, Southbridge, and other like chipsets to operably couple and communicate with the processor.

Wireless transceivers may be used to interface with peripherals 130 as well. For example, it may be possible to use a wireless interface to drive a monitor or other visual display. Similarly, this same wireless interface may be used to operably couple the computing system to peripherals such as a keyboard or mouse, a wireless headset that may include either an ear piece or microphone or both, or other like devices known to those skilled in the art.

In another example, a keyboard, mouse, video monitor, ear-piece/microphone, cell phone, base portion (landline phone), and/or 802.11 phone may each be interfaced by being Bluetooth enabled. A display associated with the computer system may be enabled to support a text window (or multiple text windows) as a subset of the display. This text window is used to service Bluetooth enabled devices. This functionality does not require interaction with a desktop computer (docked laptop computer) that also couples to the video monitor. This text window may be used for device setup, for device interaction during normal operations, to indicate a low battery status, etc.

If the video monitor services multiple Bluetooth devices, each serviced device may have its own text window. Additionally, these devices may have a small display indicating current and available attachment points, e.g., desktop computer, laptop computer, cell phone, etc. This device display could deliver text. The small text display also displays text that is transmitted to a Bluetooth enabled device with which the keyboard communicates. This interface may be used to set up and manage coupled Bluetooth devices. This setup further facilitates using a wired communication link to display primary traffic on a bus of interest and the wireless communication link to provide control-related display.

With a so-enabled keyboard, the keyboard may be used for cell phone text messaging. The keyboard may be used as an input device for text (and instructions). This concept may be extended such that a text window of the video monitor (or text display of a keyboard) is used for text display as well (if the user would like to view longer messages than are supported by cell phone display). Such a keyboard would service one device at a time, e.g., cell phone text messaging, serviced Bluetooth device setup, etc. With these operations, the keyboard would be "owned" at any time by only one other Bluetooth device. A printer could also be Bluetooth enabled and included in the piconet and service simple print jobs from the other devices.

This provides an advantage over prior solutions in that it is possible to access management, health, or performance information about the computing system without the burden of creating and supporting a hardwired interface with the system management hardware or for new operating systems and hardware.

These implementations do not require either a network interface or an interface with an embedded processor using a device driver. Typically, a network interface or an interface using a device driver requires substantial software to communicate to the management processor. This software must be developed, maintained, and supported throughout a variety of hardware and software environments.

Figure 5:
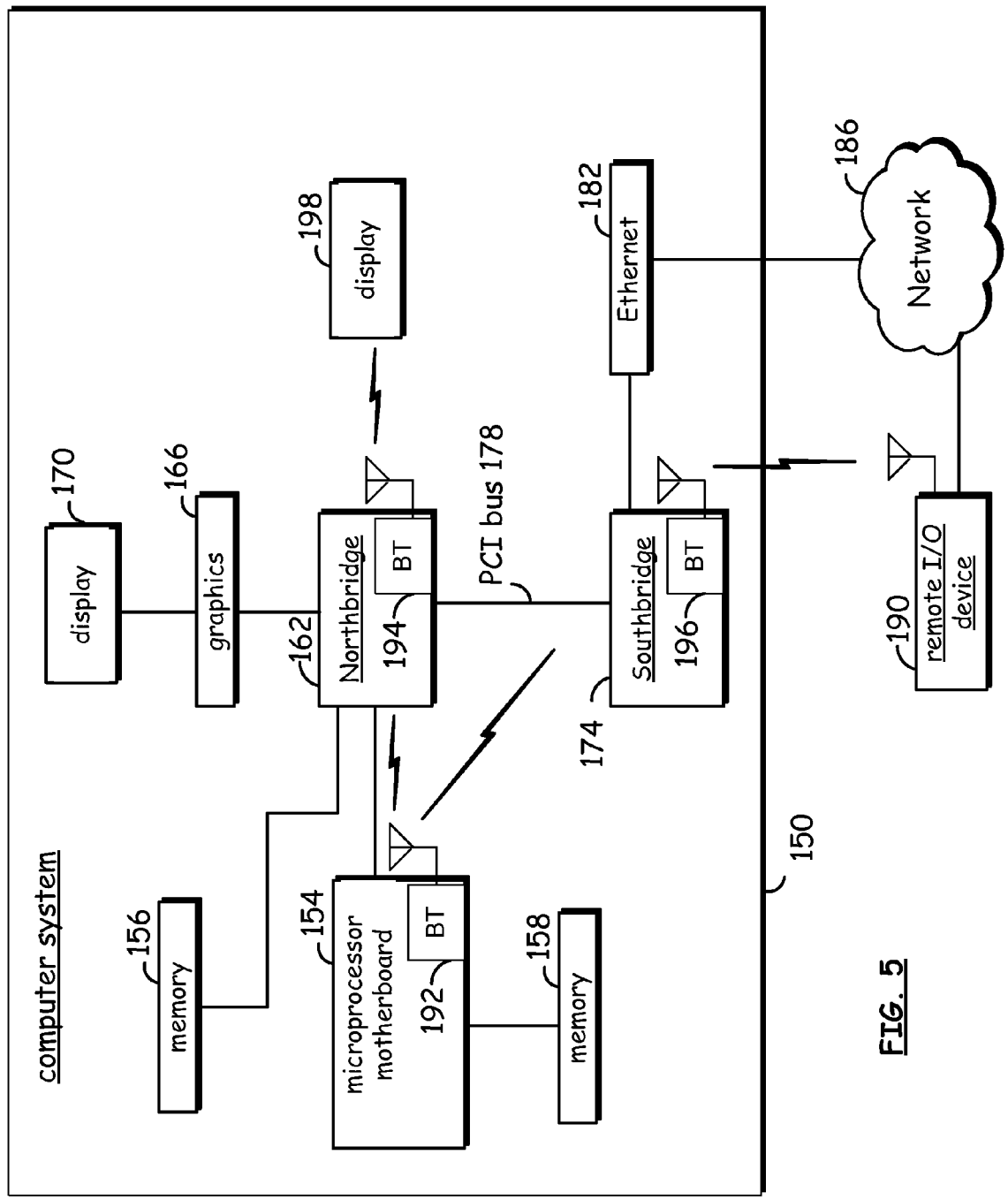
FIG. 5 is a functional block diagram of a computer system operably coupled to communicate by wired and by wireless communication links according to one embodiment of the invention.

FIG. 5 is a functional block diagram of a computer system operably coupled to communicate by wired and by wireless communication links according to one embodiment of the invention. A computer system 150 includes a microprocessor motherboard 154 that is operably coupled to communicate with a memory 158 and with a Northbridge chip 162. Northbridge 162 is further coupled to communicate with a graphics card 166 which, in turn, is coupled to communicate with a display device 170. Northbridge 162 is also coupled to communicate with a Southbridge chip 174 by way of a PCI but 178. Southbridge 174 is also coupled to communicate with an Ethernet card 182 which supports communications with external devices through a network 186.

In the example shown, Ethernet card 182 communicates with a remote I/O device 190 by way of network 186. In the described embodiment, each of the microprocessor motherboard 154, the Northbridge 162 and the Southbridge 174 include a wireless communication link, and more specifically, a Bluetooth radio 192, 194 and 196, respectively. In the described embodiment, the wireless interfaces which are formed herein by Bluetooth radios 192, 194 and 196, may readily be replaced by other types of wireless interface devices, such as IEEE 802.11 protocol radio integrated circuits or circuit blocks.

The references to Northbridge and Southbridge relate to Northbridge/Southbridge chipset architecture designs wherein the Northbridge is a chip or set of chips that connect a central processing unit to memory, to a PCI bus, to level 2 cache, to an AGP bus, and to other similar devices. Generally, the Northbridge chip communicates with the CPU to provide memory control and processing, as well as audio and graphics control and processing.

The Southbridge is the chip that controls a computer's input/output (I/O) functions through the USB audio, serial, system BIOS, the ISA bus, interrupt controllers, and IDE channels. Along similar lines, hub architectures are also employed in place of Northbridge/Southbridge chip combinations to perform similar functionality. For example, in a typical hub architecture, the Northbridge is replaced by a memory controller hub that is operable to communicate with a graphics card, with a processor on a motherboard, and to memory. The memory controller hub is further operably coupled to communicate with an I/O controller hub that provides similar functionality to the Southbridge chip. Typically, the Northbridge and Southbridge, as well as the memory controller hub and the I/O controller hub, in the alternate embodiment, are coupled by a PCI bus that is operable to conduct communication signals at a specified data rate. Typical data rates for Northbridge/Southbridge chipsets, in some architectures, equal 133 megabits per second while data rates for the memory controller hub and I/O controller hub configurations include 266 megabits per second. The Northbridge bus typically communicates with a CPU over a front side bus (FSB) and acts as a controller for memory, graphics processing, and the PCI bus. With respect to the Southbridge, the type of I/O that is controlled depends on a specific implementation of the Southbridge chip.

As may be seen, the wireless interfaces are operable to support communications between, for example, the microprocessor motherboard 154 and either one of the Northbridge 162 or Southbridge 174. The Northbridge 162, similarly, may operably communicate directly with the Southbridge 174 by PCI bus 178 or by the wireless communication link formed by the wireless interfaces supported by the Northbridge and Southbridge chips 162 and 174, respectively. As described before, Northbridge 162 further is operable to provide signals to graphics card 166 which, in turn, drives display 170. As may further be seen, however, Northbridge 162 is operable to transmit display signals through a wireless communication link to a display 198 through the wireless interface in the described embodiment of the invention. As may also be seen, Southbridge 174 is operable to communicate with remote I/O device 190 either by way of network 186 and, more specifically, through a wired connection, or a through a wireless connection through the wireless interface provided by, in the described embodiment, Bluetooth radio 196.

By including a wireless interface, here a Bluetooth radio, embedded within the circuitry of the microprocessor motherboard 154, the Northbridge 162 and the Southbridge 174, alternate communication links may be established that provide new and beneficial functionality. For example, Northbridge 162 and Southbridge 174 may cease to communicate over PCI bus 178 as a result of a communication problem within Southbridge 174. Without the communication link PCI bus 178, microprocessor motherboard 154 is unable to determine the cause of the problem and to provide any control functionality to Southbridge 174. However, by including an embedded wireless interface, such as Bluetooth radio 192 that is operable to communicate with Bluetooth radio 196 of Southbridge 174, microprocessor motherboard 154 may generate control and other signals to Southbridge 174 to determine the status of Southbridge 174, or potentially even to reset Southbridge 174 to reinitiate communications over PCI bus 178. Alternatively, Bluetooth radio 192 may be used to receive additional communication signals either from Southbridge 174 or Northbridge 162 to control the communications on PCI bus 178 without interfering or otherwise affecting such communications. While the described embodiment includes a Bluetooth radio forming a wireless interface, other radio technologies and more protocols including I.E.E.E. 802.11 standard radio technologies may readily be substituted therefor.

As another example, the embedded wireless interface in Northbridge 162 may be used to drive an alternate display device 198, for example, to provide control information to display device 198 relating to images being displayed on display 170. The use of an alternate communication path, or parallel communication path, has many benefits. As suggested already, not only may the parallel path be utilized for monitoring proper operation, for additional control, for example, to enable an operator to determine when to initiate a reset of the operation of a device, or even to provide an alternate data path as a redundant data path in the event of failure in a primary path. As yet another application, a wireless interface provided by radios, such as Bluetooth radios 192 and 194, may be used to monitor a specific circuit node on a circuit of a device whose signal values would not ordinarily be transmitted on a primary bus. For example, specific points of interest may be coupled through control or logic circuitry to the wireless interface to provide indications of signal readings therefor.

Figure 6:
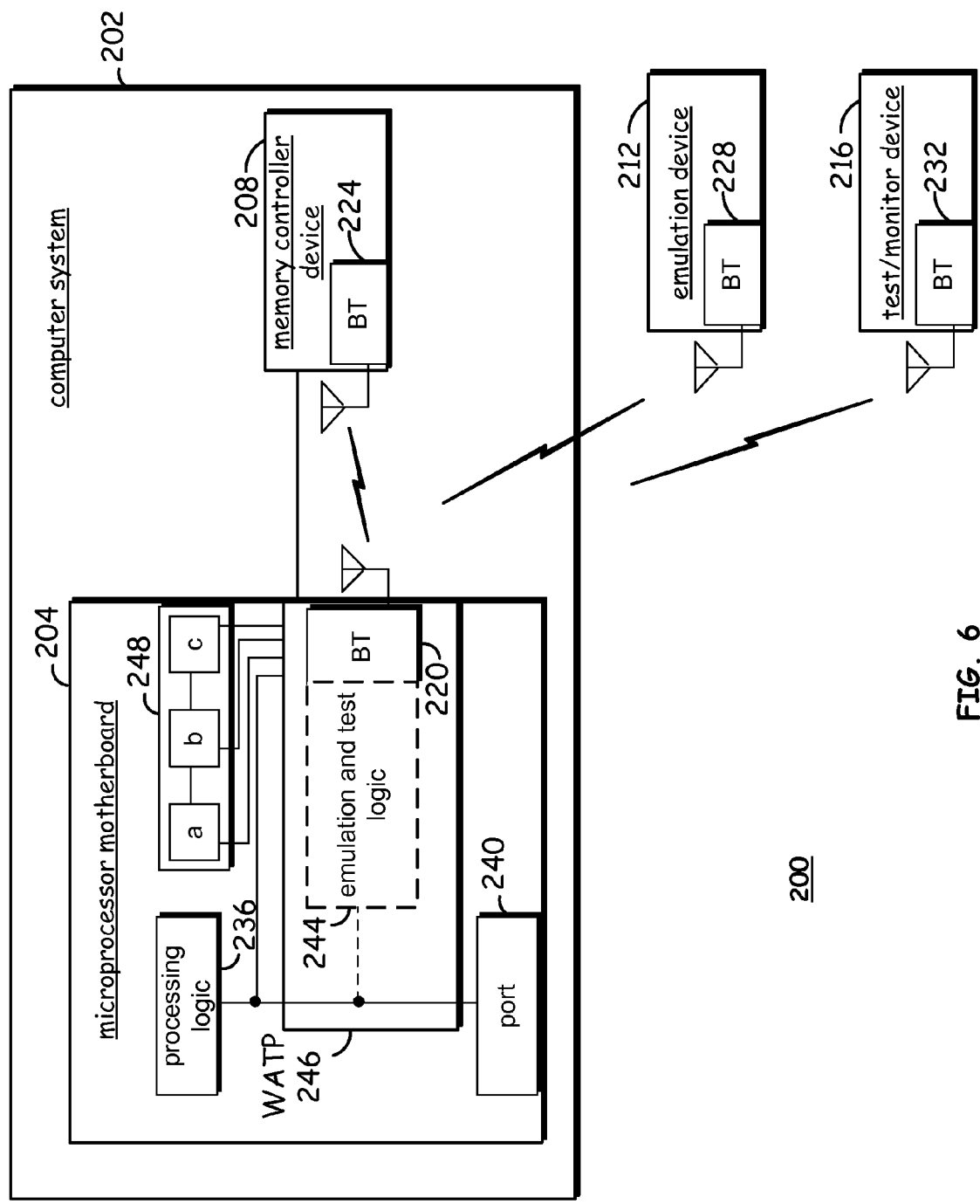
FIG. 6 is a functional block diagram of a microprocessor motherboard including an embedded wireless interface for communicating with other wireless interface devices embedded within other integrated circuits or formed within other devices according to one embodiment of the present invention.

FIG. 6 is a functional block diagram of a microprocessor motherboard including an embedded wireless interface for communicating with other wireless interface devices embedded within other integrated circuits or formed within other devices according to one embodiment of the present invention. As may be seen, a computer system 200 of FIG. 6 includes a microprocessor motherboard 204, within a computer system 202, that wirelessly communicates with one or more of a memory controller device 208, an emulation device 212, or a test/monitor device 216. In one embodiment, memory controller device 208 comprises a Northbridge chip of a Northbridge/Southbridge chip combination of a computer system.

Microprocessor motherboard 204 includes a Bluetooth radio 220 that is operable as a wireless interface device and that is embedded within the integrated circuit (a/k/a "chip"). Similarly, memory controller device 208 includes a Bluetooth radio 224 that is embedded within the chip. Emulation device 212, alternately, includes a separately formed Bluetooth radio 228. Similarly, test/monitor device 216 includes a separately formed Bluetooth radio 232. Each of the Bluetooth radios shown in system 200 may easily be replaced by other radio circuits and devices, whether embedded or formed separately, including radios formed according to IEEE 802.11 protocols and standards.

As may further be seen, microprocessor motherboard 204 includes a processing logic block 236 that is operatively coupled to a port 240, as well as to emulation and test logic 244. In the example of FIG. 5, only a Bluetooth radio was shown as an embedded device for providing a wireless interface. In the example of FIG. 6, however, microprocessor motherboard 204 includes a wireless access test point (WATP) that comprises emulation and test logic 244 as well as Bluetooth radio 220. Each instance in the described Figures which show only a Bluetooth radio may readily include emulation and test logic 244 as well to jointly form a WATP 246.

As may be seen in the described embodiment, a wireless access test point (WATP) 246 may be defined to include emulation and test logic 244 and Bluetooth radio 220 to collectively emulate either singly or with an external device, for example, port 240 and to wirelessly transmit data that would ordinarily be intended for port 240 through a wireless link to any one of emulation device 212 or test/monitor device 216. While emulation and test logic 244 is shown to be coupled directly to a line for carrying communications between processing logic 236 and port 240, it is understood that a switch may be inserted at the coupled node to direct communication traffic either to emulation and test logic 244 or to port 240. Emulation and test logic 244, in turn, is coupled to Bluetooth radio 220. Similarly, a circuit block 248 which includes circuit elements labeled as "a", "b" and "c". As may further be seen, circuit elements "a", "b" and "c" are directly coupled to Bluetooth radio 220, wherein Bluetooth radio 220 is operable to wirelessly transmit signal values from any one of circuit elements "a", "b" and "c" to any one of memory controller device 208, emulation device 212 and test/monitor device 216.

Having a Bluetooth radio embedded within microprocessor motherboard 204 of computer system 202 facilitates creating an alternate communication path, namely a wireless communication path, between microprocessor motherboard 204 and memory controller device 208. This alternate communication path has many useful applications, including providing redundancy should the primary wired communication path fail. An alternate use for the wireless communication link is to provide monitoring or "snooping" functionality of a specified circuit element or circuit communication path. For example, Bluetooth radio may monitor specified nodes or circuit elements represented as elements "a", "b" and "c" of block 248, or, alternatively, the actual serial data communications between processing logic 236 and port 240. Thus, in one mode of operation, Bluetooth radio 220, being coupled directly to the transmission path between processing logic 236 and port 240, may wirelessly transmit the signals being produced through port 240 to memory controller device 208. Alternatively, emulation and test logic 244, which may alternately be included in wireless access test point 246, may emulate a port, such as port 240, wherein processing logic 236 is operable to produce data in a routine protocol for port 240 while, in fact, the data is being wirelessly transmitted by Bluetooth radio 220 to, in this embodiment, one of emulation device 212 or test/monitor device 216. Emulation and test logic 244 is operable to generate signals to processing logic 236 to cause it to react as if it were communicating with an external device directly through port 240. For example, the emulation and test logic 244 may emulate a hard disk drive.

In yet another embodiment of the invention, emulation and test logic 244 is operable to interact with Bluetooth radio 220 to produce specific signals to specified circuit elements and to measure a corresponding response and, finally, to produce the measured response to one of emulation device 212 or test/monitor device 216. For example, if test/monitor device 216 generates a control signal which is received by Bluetooth radio 220 indicating that a specified input signal is to be produced to element "b", and a response is to be measured from element "c", emulation and test logic 244, in conjunction with Bluetooth radio 220, produces a signal based upon the specified signal value to element "b" and measures the corresponding result at element "c" and wirelessly transmits the result to test/monitor device 216.

The WATP 246 of FIG. 6 is operable, therefore, to provide test data or signal values from specified test points for which access is not ordinarily provided. Additionally, it should be understood that test procedures may also be initiated and controlled from such a WATP 246 as well. While the above example explained providing only one stimulation and measuring one response at the same or at a different circuit device or test point, it should be understood that a plurality of stimulations and corresponding measurements may be made as a part of a test procedure. Thus, while incorporating a Bluetooth radio singly or as a part of a WATP 246, provide "snooping" of data, the embodiments of the invention further provide for improved testing options and further provide for emulation of specific hardware devices to aid, for example, in data capture by a remote device.

Figure 7:
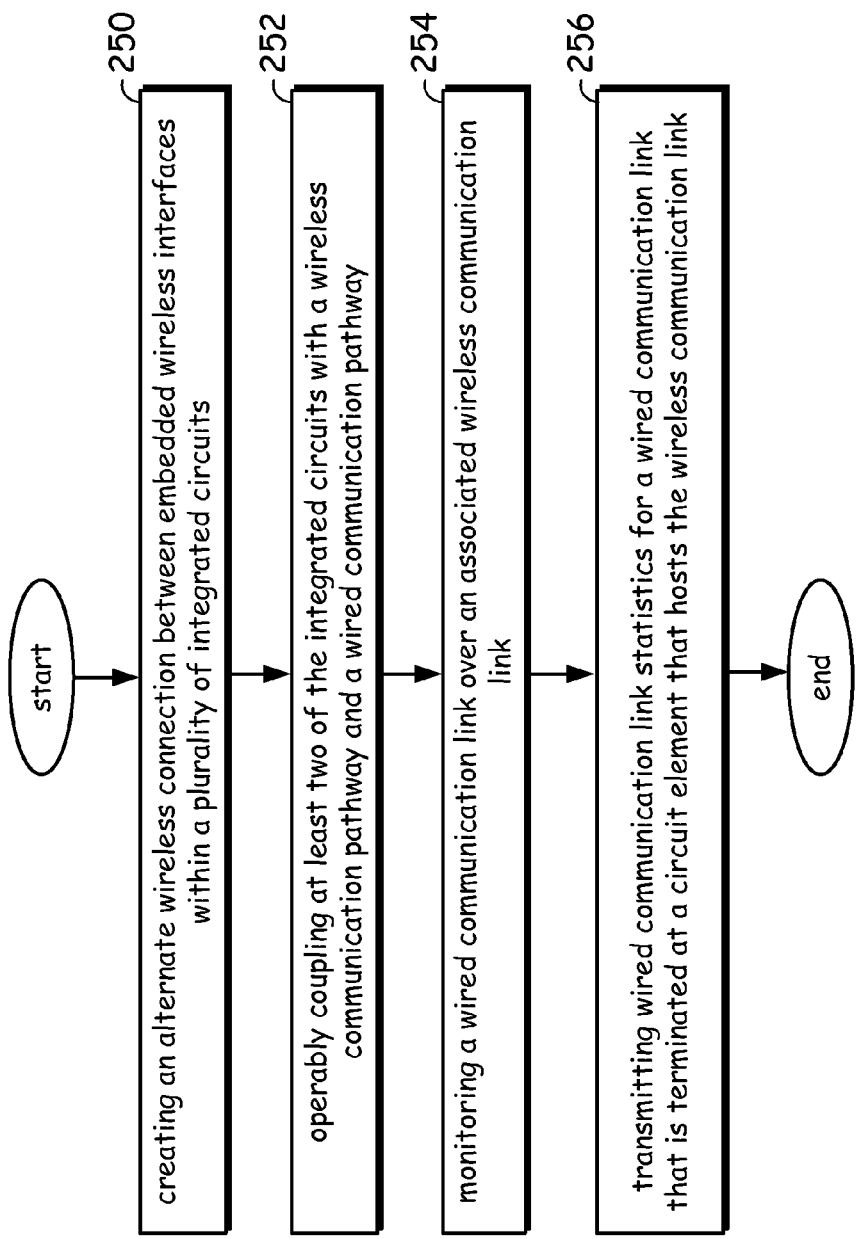
FIG. 7 is a flowchart illustrating a method according to one embodiment of the present invention.

FIG. 7 is a flowchart illustrating a method according to one embodiment of the present invention. Generally, the method of FIG. 7 is a method for integrating computer system components within a single computer and further to allow a wireless interface link embedded within the computer system to communicate with an external device. Generally, the method includes initially creating an alternate wireless connection between embedded wireless interfaces within a plurality of integrated circuits within the single computer system (step 250). Thereafter, the method includes operably coupling at least two of the integrated circuits with a wireless communication pathway and a wired communication pathway (step 252). In a typical computer system, devices within a motherboard, and between the motherboard and other printed circuit boards or systems holding integrated circuits, are coupled through traces and other forms of wired connections. Such wired connections form the primary communication paths for two devices. The method according to the present embodiment of the invention, as described in step 252, however, includes creating an alternate communication pathway to the wired communication pathway. This alternate communication pathway may be used either to provide redundancy for a failure in the wired communication pathway or, alternatively, to provide "snooping" or monitoring of operations and communications along the wired communication pathway. Thus, as one aspect of the present invention, the method according to the described embodiment includes monitoring a wired communication link over an associated wireless communication link (step 254). The wired communication link statistics is then transmitted for a corresponding wired communication link that is terminated at a circuit element that hosts the wireless communication link (step 256).

Figure 8:
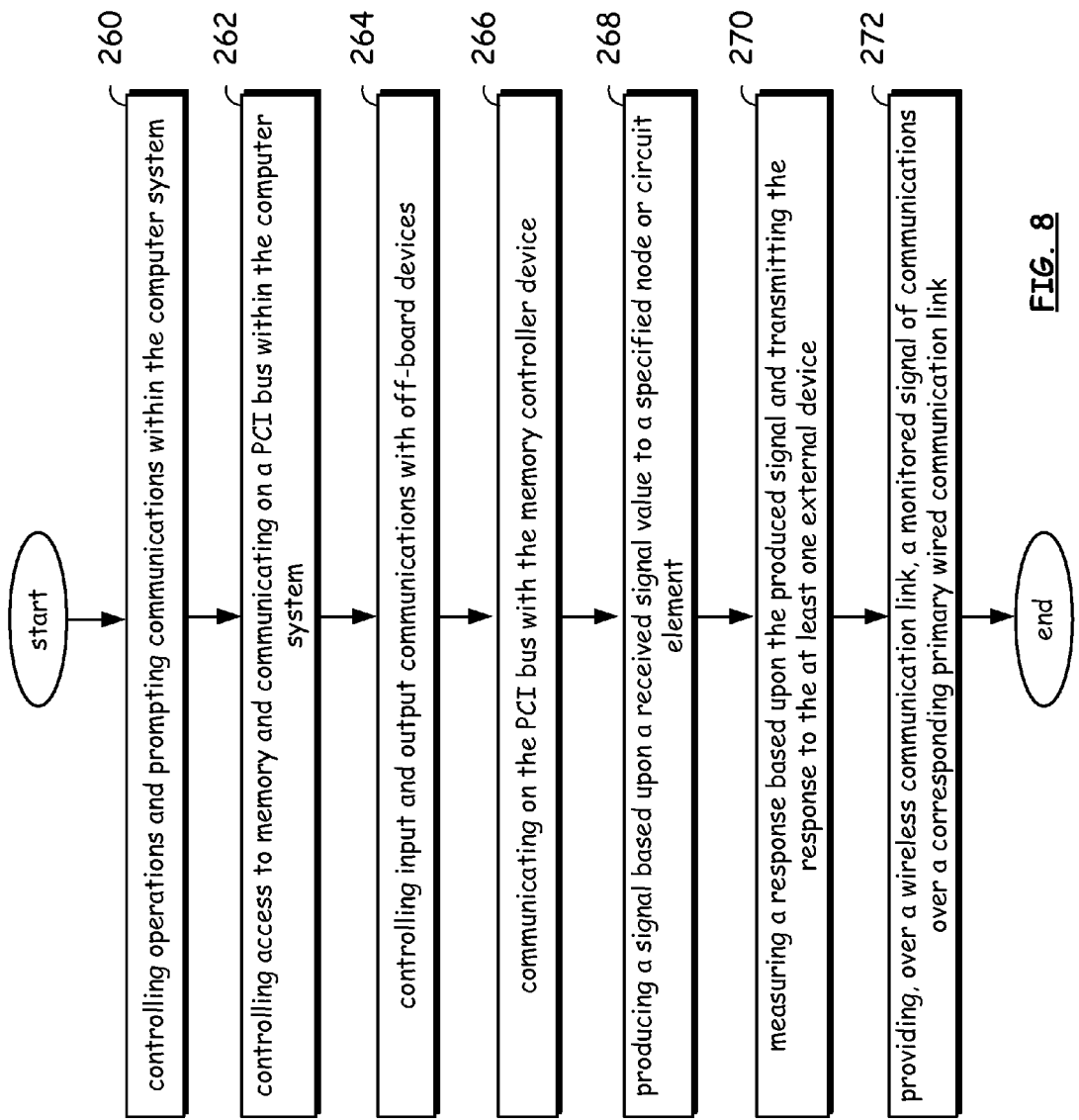
FIG. 8 is a flowchart that illustrates a method for testing a circuit device according to one embodiment of the present invention.

FIG. 8 is a flowchart that illustrates a method for testing a circuit device according to one embodiment of the present invention. The method initially includes controlling operations and prompting communications within the computer system (step 260). Additionally, the method, according to the described embodiment, includes controlling access to memory and communicating on a PCI bus within the computer system (step 262). Additionally, the embodiment of the described invention includes controlling input and output communications with off-board devices (step 264). The method, according to the described embodiment, further includes communicating on the PCI bus with the memory controller device (step 266). Each of the above-described steps includes routine operations within a computer system and within the various devices and circuits of the computer systems, such as the processor installed within a motherboard or within a Northbridge/Southbridge chip combination. The described embodiment of the invention further includes producing a signal that is based upon a received signal value to a specified node or circuit element (step 268). Remembering that the wireless interface described in the present embodiments of the invention is often formed as an embedded wireless interface to an integrated circuit or at least embedded within a motherboard or Northbridge/Southbridge chip combination, the step of receiving a specified signal value from an external device to produce an input signal for test purposes is advantageous in that a response may be measured and determined, if proper, without requiring traditional circuit input and output ports and interference with the operation of the same. For example, a wireless radio interface may be formed to approximate to a desired test point or monitoring point. After producing a signal based upon a received signal value to a specified node or circuit element, the described embodiment of the invention includes measuring a response based upon the produced signal at a specified point and transmitting the response to at least one external device (step 270). The measured response is not necessarily measured from the circuit element to which the signal was produced in the previous step. Finally, the described embodiment of the invention includes providing, over a wireless communication link, a monitored signal of communications over a corresponding primary wired communication link (step 272).

Each of the above described methods of the invention described operational aspects of the embodiments of the invention. Thus, each computer system illustrated herein is specifically operable to perform one or more of the above described methods of the embodiments of the invention.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. For example, any known telephone protocol may be utilized for establishing any of the described telephone links. For example, mobile station may comprise logic for establishing a first data context for carrying Voice over IP calls by way of the first radio front end and for establishing a second data context through the second radio front end. Similarly, the landline docking station base unit may comprise logic for establishing a data context for carrying Voice over IP calls (for the described voice paths herein). As may be seen, therefore, the described embodiments may be modified in many different ways without departing from the scope or teachings of the invention.

The invention claimed is:

1. An apparatus for monitoring and testing a circuit installed in a circuit board, comprising:
   first and second circuit blocks of the circuit coupled via a wired communication path for conducting ongoing signal data transmissions by transmitting data through the wired communication path; and
   first and second transceivers disposed in the circuit board, the first transceiver for wirelessly receiving from the second transceiver one of a sample of the ongoing signal data transmissions being transmitted through the wired transmission or a signal reflecting a characteristic of the ongoing signal data transmissions;
   wherein the first transceiver further wirelessly transmits to a remote test device the one of the sample of the ongoing signal data transmissions or the signal reflecting the characteristic of the ongoing signal data transmissions via a wireless communication link with the remote test device.

2. The apparatus of claim 1, further comprising:
   a processor coupled to the first transceiver for producing a test signal based upon a received test signal value from the remote test device.

3. The apparatus of claim 2, wherein the processor further measures a response based upon the produced test signal and wirelessly transmitting the response to at least one external device via the first transceiver.

4. The apparatus of claim 3, wherein the test signal value and the response are both transmitted through a wireless access point coupled to a data packet network to which the remote test device is coupled.

5. The apparatus of claim 2, wherein the first and second blocks are circuit blocks co-located on a common circuit board.

6. The apparatus of claim 2, wherein the processor further executes test procedures and transmits test data received from test points in the first and second circuit blocks via the first and second transceivers to the remote test device as a part of the test procedures.

7. The apparatus of claim 2, wherein the processor further simulates an operation and transmits corresponding data received from the first and second circuit blocks via the first and second transceivers to the remote test device as a part of the simulated operation.

8. A system, comprising:
   first and second circuit blocks coupled via a wired communication path for transmitting signals therebetween;
   first and second wireless transceivers for wirelessly communicating therebetween to support test procedures to test at least a portion of the first or second circuit blocks;
   wherein one of the first and second wireless transceivers further wirelessly transmits to a remote test device one of a sample of the transmitted signals, a signal reflecting a characteristic of the transmitted signals, or test data from a specified test point transmitted wirelessly between the wireless transceivers within the device.

9. The system of claim 8, further comprising:
   a processor for producing a test signal based upon a received test signal value from the remote test device.

10. The system of claim 9, wherein the processor further measures a response based upon the produced test signal and wirelessly transmits the response to at least one device via one of the first and second transceivers.

11. The system of claim 10, wherein the test signal value and the response are both transmitted through a wireless access point coupled to a data packet network to which the remote test device is coupled.

12. The system of claim 8, wherein the first and second blocks are circuit blocks co-located on a common circuit board.

13. The system of claim 8, wherein the first and second blocks are circuit blocks co-located within a common device.

14. The system of claim 8, wherein the first and second blocks are circuit blocks located within different devices.

15. A device, comprising:
   first and second integrated circuit blocks having a primary wired communication link for communicating therebetween;
   a first transceiver coupled to the first integrated circuit block for creating a wireless communication link between the first integrated circuit block and a remote third circuit block to support testing or monitoring operations specified by the remote third block; and
   a second transceiver coupled to the second integrated circuit block for wirelessly communicating with the first transceiver to transmit data corresponding with communications on the primary wired communication link between the first and second integrated circuit blocks;
   wherein the first integrated circuit block further wirelessly communicating with the third circuit block via the first transceiver to transmit the data corresponding with the communications on the primary wired communication link.

16. The device of claim 15, wherein the first transceiver further wirelessly transmits sensor data for at least one sensor associated with the first circuit block.

17. The device of claim 16, wherein the sensor data comprises at least one of management, health and performance information associated with the device.

18. The device of claim 15, wherein the first transceiver further receives from the third circuit block a specified signal to be transmitted to a specified test point within the first and second integrated circuit blocks and wirelessly transmits an associated output signal to the third circuit block.

* * * * *